United States Patent [19]

Lando

[11] Patent Number: 5,019,451
[45] Date of Patent: May 28, 1991

[54] NON-CENTROSYMMETRIC, MULTI-LAYER LANGMUIR-BLODGETT FILMS

[75] Inventor: Jerome B. Lando, Shaker Heights, Ohio

[73] Assignee: Edison Polymer Innovation Corp., Broadview Heights, Ohio

[21] Appl. No.: 344,276

[22] Filed: Apr. 27, 1989

[51] Int. Cl.$^5$ .............................................. B32B 9/00
[52] U.S. Cl. .................................... 428/411.1; 428/1; 428/457; 427/402; 427/434.4; 522/173
[58] Field of Search ....................... 428/411.1, 457, 1; 427/434.3, 402; 522/173

[56] References Cited

U.S. PATENT DOCUMENTS

| | | | |
|---|---|---|---|
| 4,690,857 | 9/1987 | Shirahata | 428/411.1 |
| 4,761,298 | 8/1988 | Vig | 427/10 |
| 4,783,348 | 11/1988 | Albrecht et al. | 427/434.3 |
| 4,876,150 | 10/1989 | Smith | 428/411.1 |
| 4,970,120 | 11/1990 | Laschewsky | 428/411.1 |

OTHER PUBLICATIONS

Ref. 104:120043d, "Method of Fine Patern Formation", JP 60,222,848, Nov. 7, 1985.
Ref. 105:123928c, "Dynamic Pyroelectric Response of Langmuir-Blodgett Film Infrared Detectors", *J. Phys. D: Appl. Phys.*, 1986.
105:89495x, "Pyroelectric Activity in Non-Centrosymmetric Langmuir-Blodgett Multilayer Films", *Thin Solid Films*, 1985.
Ref. 106:167156z, "Optimization of Thermal Performance of Langmuir-Blodgett Film Pyroelectric Devices", *Thin Solid Films*, 1987.
Ref. 106:225885z, "Languir-Blodgett Films", PCT Int. Appl. EO 8700,347.
Ref. 107:205639q, "Surface-Pressure Effects on Langmuir-Blodgett Multilayers of 22-Tricosenoic Acid", *Surf. Sci.*, 1987.
Ref. 108:196676r, "IR Studies of Pyroelectric Langmuir-Blodgett Films", *Thin Solid Films*, 1987.
Ref. 108:230378g, "Pyroelectricity in Ulta-Thin Organic Superlattices", *Symp. Appl. Ferroelectr.*, 1986.
"Pyroelectric Activity in Non-Centrosymmetric Langmuir-Blodgett Multilayer Films", *Thin Solid Films*, 132 (1985) 125-134.

*Primary Examiner*—Patrick J. Ryan
*Assistant Examiner*—Amara E. Lim
*Attorney, Agent, or Firm*—D. Peter Hochberg; Mark Kusner; Louis J. Weisz

[57] ABSTRACT

Non-centrosymmetric films are shown that exhibit pyroelectric and piezoelectric properties. The films, which comprise alternating layers of omega-tricosenoic acid and omega-tricosenoic amine of up to nine layers thick, and alternatively, layers of polymeric amphiphiles that utilize their liquid crystalline side chains to impose order on the lamiante structures, are useful in constructing devices for measuring temperature and pressure functions.

8 Claims, 4 Drawing Sheets

NON-CENTROSYMMETRIC, MULTI-LAYER LANGMUIR-BLODGETT FILMS

TECHNICAL FIELD

This invention relates to polar oriented Langmuir-Blodgett films possessing pyroelectric and piezoelectric properties. More particularly, this invention relates to non-centrosymmetric multi-layer Langmuir-Blodgett films useful for fabricating devices responsive to, and capable of measuring temperature and pressure changes. Specifically, this invention relates to Langmuir-Blodgett films made from multiple layers of polymerizable salts and salt-like compounds which exhibit dipole moments of a magnitude sufficient to make the films useful in thermo, acoustical, non-linear optical, and other detection and measuring devices.

BACKGROUND OF THE INVENTION

The increasing demand for smaller, more compact electronic devices has led to extensive research and development in the field of microelectronic circuitry. As a result of this effort, major advances have been made in the field in the past decades. However, it is becoming increasingly apparent that the field of miniaturization has reached, or at least is rapidly approaching the point at which further progress will be increasingly difficult to achieve unless new and innovative approaches are resorted to.

In this connection, the scientific community has for some time been aware that certain biological systems make use of organic molecules to store and transfer electrical charges. Bilipid membranes consisting of phospholipid bilayers having globular proteins located therebetween, for example, perform such functions in nature. In view of the existence of these and similar systems, the attention of researchers is increasingly being focused on the use of organic films, including both mono-molecular, and multi-layer films to perform electronic functions.

In particular, interest has been directed to the use of Langmuir-Blodgett films formed from a variety of organic molecules to produce highly oriented, uniform films from about 10–5,000 nanometers thick. The formation of Langmuir-Blodgett films involves the deposition of amphiphilic molecules onto a water surface where they form a mono-molecular film. The molecules dispose themselves across the surface of the water in an oriented configuration in which their hydrophilic end is positioned adjacent to the surface of the water, while their hydrophobic end is directed away therefrom. After deposition, commonly from a relatively volatile solvent, the molecules are forced together by means of a movable hydrophobic barrier which compresses the molecules into a continuous film, one molecule thick. Substrates can thereafter be passed through the film in a direction perpendicular thereto, resulting in the coating of the substrates with a monomolecular film of the material. Molecules in the film are disposed adjacent and parallel to each other at an angle to the surface of the substrate, in some cases approaching 90° C. By repeatedly passing the substrates through the film, or sequentially through different films, multiple-layer film structures can be prepared, either consisting of identical molecular layers, or alternating, different molecular layers, as the case may be.

The Langmuir-Blodgett techniques thus permit "engineered" films to be formed from specific materials, in whatever thickness is required. The thickness can be controlled, for example, by the number of layers of molecules deposited on the substrate, as well as by the length of the molecules employed to form the films. In addition, when molecules exhibiting polar characteristics are used to form such films, the dipole moment of the molecules can provide a difference in electric potential across their length sufficient to allow electronic functioning to be realized, including pyroelectric, piezoelectric and non-linear optical effects.

In order for films to demonstrate such functioning, it is necessary that the molecules comprising them have a polar axis resulting from their spontaneous polarization. In instances where the spontaneous polarization of the molecules varies with the temperature or pressure to which the molecules are exposed, the neutralization of the polarization charge at the surface of films made from the molecules by ions present in the surrounding atmosphere, or from other causes, is too slow to prevent detection of a charge in the amount of the surface charge. It is this change in spontaneous polymerization with temperature, or pressure, termed the pyroelectric coefficient in the case of temperature, and representing the change in spontaneous polarization per degree of temperature change, on which the successful use of such films in certain detection devices is predicted. The measurable charge thus produced is substantially proportional to the product of such coefficient and the temperature change.

Materials having pryoelectric characteristics have been known for a considerable period of time. Ferroelectrics, for example, are among the more conventional pyroelectric materials, and while ferroelectrics show relatively high pyroelectric coefficients, they must be operated at relatively high heat levels, e.g., near their Curie temperature, in order to obtain the higher changes in spontaneous polarization values with temperature of which they are capable.

In the organic area, films formed from vinylidene fluoride have in the past been prepared which also display pyroelectric effects. Such films are relatively thick, however, and require substantial energy inputs to raise their sensible temperatures. Thus, they tend to suffer from a lack of thermal sensitivity. In addition, such films must initially be "polled", i.e., exposed to externally applied magnetic flux to activate them.

Considerable work has also been done using Langmuir-Blodgett techniques to develop pyroelectric materials. Various saturated fatty acids have, for instance, been combined with stearylamine, and the latter compound has also been combined with unsaturated omega-tricosenoic acid, the films comprising alternating layers of such materials. The aforementioned films display pyroelectric coefficients of varying values, at least some of which are of sufficient magnitude to be useful in pyroelectric measurements. However, as in the case of the vinylfluoride materials, such films have in the past involved the lamination of a relatively large number of molecular layers, for example, 500 layers. Such laminations, therefore, not only entail excessive processing for their fabrication, but in addition, the thickness of the resulting structures requires a greater heat input to produce a given rise in temperature. Consequently, the laminates are comparatively insensitive relative to thinner films, the latter being much more desirable.

Furthermore in instances where the fabrication of thinner laminations is attempted, the resulting films tend to be fragile and susceptible to damage when physically stressed, imposing limitations on the applications in which they can be used.

DISCLOSURE OF THE INVENTION

In light of the foregoing, therefore, it is a first aspect of this invention to provide Langmuir-Blodgett films that exhibit pyroelectric and piezoelectric effects.

A second aspect of this invention is to provide Langmuir-Blodgett films having useful pyroelectric coefficients.

Another aspect of this invention is to furnish Langmuir-Blodgett films of minimal thickness, whose net dipole moment is sufficiently large to be detectably responsive to relatively small temperature and pressure changes.

An additional aspect of this invention is to make available Langmuir-Blodgett films useful in the fabrication of temperature and pressure sensing devices.

Another aspect of this invention is to provide Langmuir-Blodgett films which display enhanced sensitivity to temperature changes.

Yet another aspect of this invention is to provide Langmuir-Blodgett films which produce highly stable layers of oriented molecules on the aqueous subphase of a Langmuir-Blodgett balance.

A further aspect of this invention is to provide Langmuir-Blodgett film structures in which the molecular layers can be disposed in repeating head-to-tail sequences as well as in head-to-head, tail-to-tail sequences.

A still further additional aspect of this invention is to furnish Langmuir-Blodgett laminate layers that can be polymerized to form stable and durable, pyroelectrically and piezoelectrically active films of relatively few layers.

The preceding and still additional aspects of the invention are provided by a non-centrosymmetric polymerized salts having molecular configurations adapted for ordering in adjacent parallel rows, wherein a plurality of said adjacent ordered parallel rows are positioned in substantially adjacent parallel layers to form said film structure, said salts comprising members selected from the group consisting of (1) a terminally unsaturated, straight chain aliphatic acid in association with a terminally unsaturated straight chain aliphatic amine, and (2) an unsaturated polymerizable salt containing both a polar group and a mesogen, being capable of mesomorphic molecular arrangement.

The preceding and other aspects of the invention are provided by a device for detecting temperature and pressure changes that includes a film structure according to the preceding paragraph.

The preceding and still other aspects of the invention are provided by a device for detecting temperature and pressure changes which comprises:

a non-centrosymmetric film structure, and means for detecting changes in electrical potential generated across said structure when said structure is exposed to temperature or pressure changes, wherein said structure comprises a laminated plurality of substantially adjacent, parallel, monomolecular layers of a salt comprising a member selected from the group consisting of (1) layers of omega-tricosenoic acid associated with layers of omega-tricosenoic amine, and (2) a polymerizable salt containing both a polar group and a mesogen, being capable of mesomorphic molecular arrangement.

BRIEF DESCRIPTION OF THE DRAWINGS

The invention will be better understood when reference is had to the following Figures, in which like-numbers refer to like-parts, and in which.

DETAILED DESCRIPTION OF THE INVENTION

Figure 1:
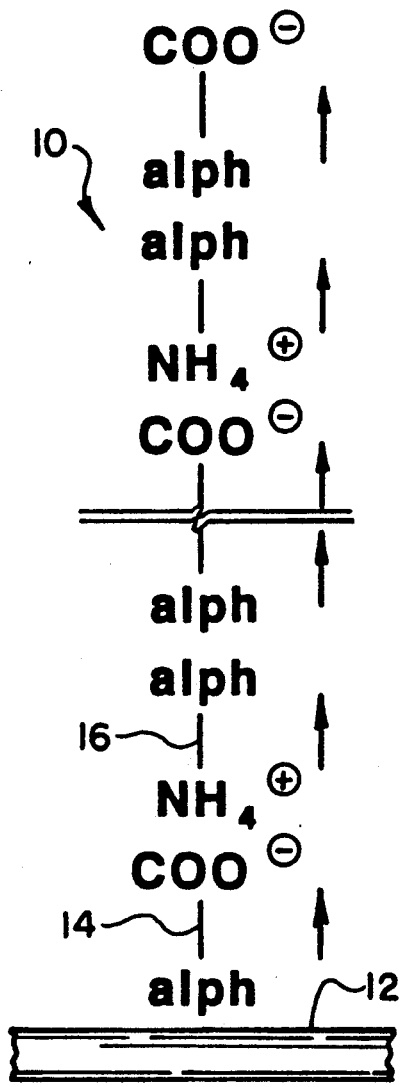
FIG. 1 is an illustration of the structural arrangement of salt-like molecules exemplifying a multi-layer film of the invention.

FIG. 1 is an illustration of the structural arrangement of molecules exemplifying the multi-layer tricosenoic films of the invention, generally 10. In the Figure, a substrate 12 has been initially coated with a layer of omega-tricosenoic acid 14 and thereafter, with a layer of omega-tricosenoic amine 16. Additional layers of the acid and the amine are subsequently added to the laminate, in alternating sequence, until a final layer of acid is deposited to provide the total number of layers desired.

The molecules making up the film are disposed in a tail-to-tail, AABB, configuration; however, due to the fact that the acid and the amine have their dipole moments oriented in opposite directions, the resulting film is non-centrosymmetric, and the dipole moments are additive. It appears that proton transfer occurs at the acid/amine interface, resulting in the formation of a "salt"-type film structure.

While FIG. 1 illustrates a substrate in which the hydrophilic tail portion of the molecule in the initial layer is adjacent to the substrate, with a hydrophilic head portion, in the case of the Figure an acid group, located at the exposed surface of the outermost layer, the orientation of the molecules making up the film may be reversed. In such case, a hydrophilic head portion, either the amine or the acid group, would be adjacent to the substrate, while the exposed surface of the outermost film layer would comprise the hydrophobic aliphatic tail portion of either the amine or the acid molecule. In such case, the dipole moment of the film would be reversed; however, the ability of the film to detect temperature changes would be unaffected.

Surprisingly, it has been found that when layers of terminally unsaturated tricosenoic acid are alternated with layers of terminally unsaturated tricosenoic amine, it is possible to obtain desirably strong thin film laminates by polymerizing the molecules in the respective layers at their points of unsaturation. Films formed from the polymerized layers nevertheless display satisfactory pyroelectric coefficients. As previously described, the use of thin films provides the advantage that a detectable temperature change can be produced in the film with a smaller exposure to an energy source of interest. Expressed differently, the film is more sensitive to small variations in the heat which it is absorbs, making it a more useful detector. Despite the relatively few layers making up the tricosenoic film structures, it has been found possible to obtain pyroelectric coefficients in the order of $1.14 \times 10^{-10}$ C cm$^{-2}$ K$^{-1}$. Furthermore, even though polymerized, the thin films are sufficiently pliant to vibrate under the influence of temperature while still maintaining a satisfactory pyroelectric value.

Figure 1A:
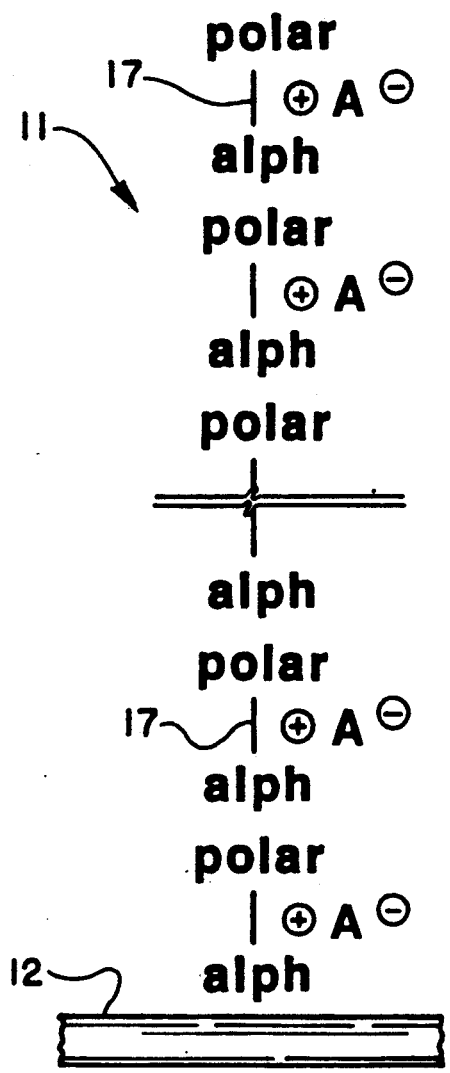
FIG. 1A is an illustration of the structural arrangement of another salt exemplifying a multi-layer film of the invention.

FIG. 1A is an illustration of the structural arrangement of another salt exemplifying a multi-layer film of the invention. As illustrated in the Figure, layers 17 of a polymerizable, mesogen-containing, highly polar liquid crystalline amphiphile of the invention. As shown, the molecular layers are oriented in a head-to-tail, head-to-tail, ABAB configuration. The anion "A" is shown in coulombic association with the cation portion of the salt.

It has been found possible to prepare such molecules, capable of arranging themselves in a highly ordered state and exhibiting a strong dipole moment, by synthesizing molecules with mesogen constituents able to orient themselves in mesomorphic layers or planes, providing a high degree of order to the films. When a highly polar group is also included within the structure of the molecules, the molecular ordering allows the dipoles of stacked layers of the molecules to be additive, resulting in a relatively high, net dipole moment. When a point of unsaturation is also introduced into the structure of the molecules, especially at, or near the end of the molecular structure, where their presence does not interfere with molecular order, the molecules may be polymerized to form relatively tough monomolecular films. It has been found possible to prepare such molecules in the form of a salt, by synthesis methods well known in the art, and when sequential layers of the films formed with Langmuir-Blodgett techniques are sequentially formed on top of each other, for example, on a suitable substrate, laminate film structures having a relatively high polarity are obtained.

Figure 1B:
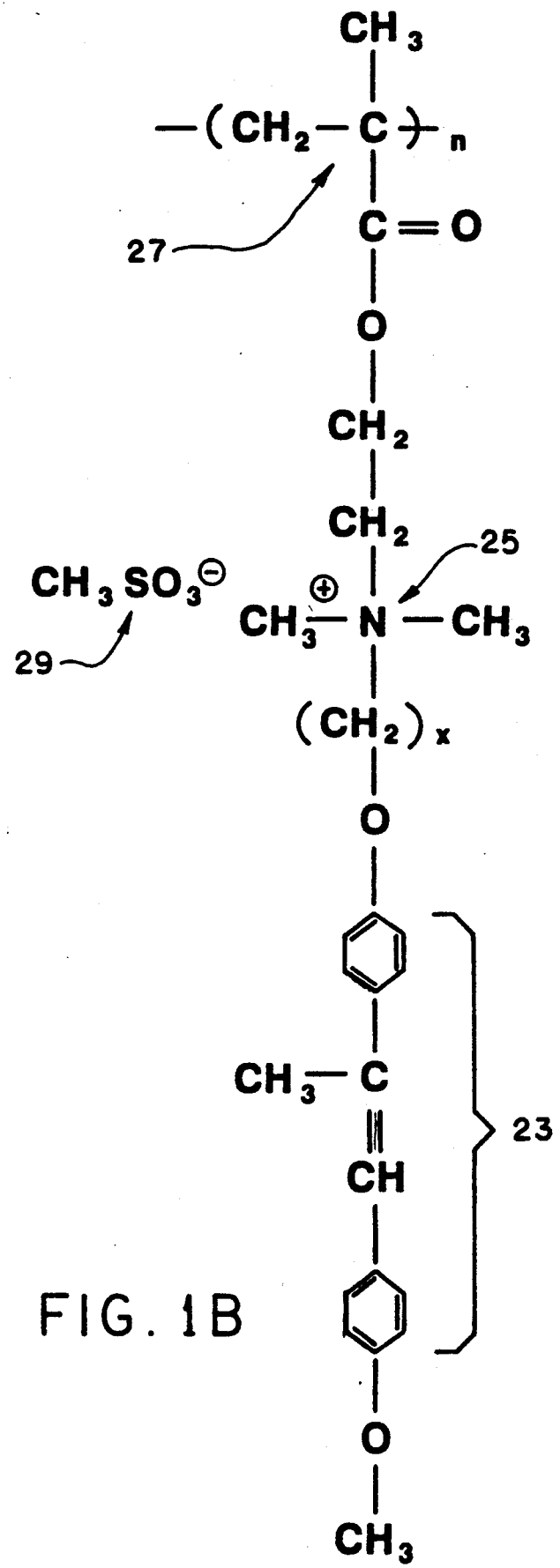
FIG. 1B is a structural formula of a polymerizable, mesogen-containing, highly polar liquid crystalline amphiphile of the invention.

FIG. 1B illustrates a polymerizable salt of the latter type, comprising a cation having a polymerizable point of unsaturation 27, a highly polar group 25, and a mesogen 23 capable of inducing mesamorphic molecular arrangements. The cation shown, includes a methyl sulfonate anion 29 in coulombic association therewith. While a methyl sulfonate ion is illustrated, similar salts may be formed with other negative ions, for example, Br$^-$, NO$_3$, ClO$_4^-$ and others.

Similarly, various polar groups other than the quaternary ammonium group shown, of the types well known to those skilled in the art, may also be used. The location of the group may be varied, and will commonly be determined by requirements of the synthesis route selected.

The stilbene mesagen shown at 23 may also be varied, any of various aromatics, alicyclics, and derivatives thereof, of the mesogen types well known in the art being suitable. As in the case of the polar groups, the location of the mesogens in the molecule may be varied.

While the point of unsaturation shown in FIG. 1B comprises a methacrylate ester, other unsaturated structures may also be employed, depending upon the requirements of the synthesis. The value of "n", the number of monomeric units polymerized to form the films will depend upon the conditions of polymerization, the physical characteristics desired for the film, and similar considerations.

In synthesizing the compound of FIG. 1B, the value of the spacer groups "x" will conveniently be 3, 6, 8, or 11.

While head-to-tail arrangements of ordinary Langmuir-Blodgett films are normally difficult to achieve due to the tendency of the molecules to spontaneously rearrange themselves into a head-to-head, tail-to-tail configuration, the tendency to undergo such rearrangement is prevented by the ordered packing of the molecular mesogens, as well as by polymerization of the monomer units into interconnected chain structures. Consequently, the neutralization of dipole moments which would otherwise occur in adjacent layers of the same molecular structure is avoided.

In preparing laminate film structures using highly polar liquid crystalline polymeric amphiphiles containing a liquid crystalline side chain to impose order on the system, the amphiphilic salts are deposited on the water subphase surface of a Langmuir-Blodgett balance in one of several ways. Either the amphiphiles can be prepolymerized and deposited, usually from a solvent solution, onto the surface, or amphiphiles in the form of a monomer can be deposited on the surface and then polyemrized in-situ. The monomers can also be polymerized after the laminate film structures have been prepared. Coating may be carried out either in a vertical fashion, as shown in connection with FIG. 2, or by means of a horizontal technique, shown in FIG. 2A.

Figure 2:
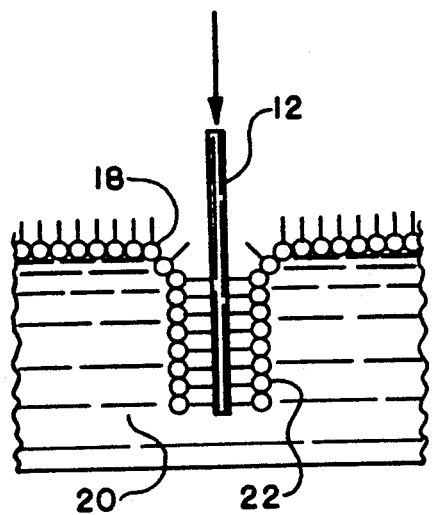
FIG. 2 is a diagrammatically representation of a substrate being coated by vertical dipping with a film of the invention in a Langmuir-Blodgett balance.
Figure 2A:
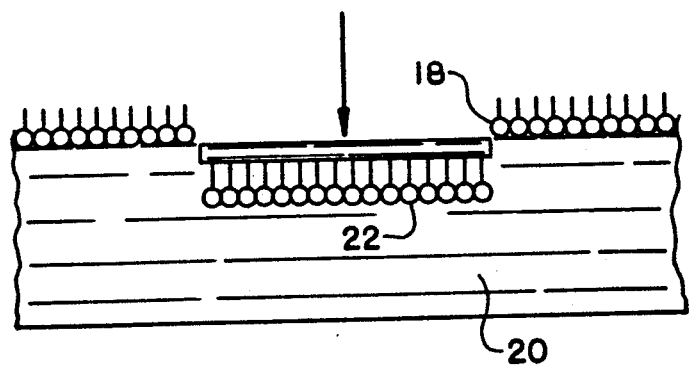
FIG. 2A is a diagrammatic representation of a substrate being coated by horizontal dipping with a film of the invention in a Langmuir-Blodgett balance.

In FIG. 2A, a susbtrate 12 is passed horizontally through the monomolecular film 18, disposed over the surface of the water subphase 20, coating the lower surface of the substrate in the process. Subsequent layers of the film can be deposited, using techniques such that previously described.

FIG. 2 is a diagrammatically representation of a substrate being coated by vertical dipping with a film of the invention in a Langmuir-Blodgett balance. In the Figure, a substrate 12 has been inserted downwardly through a molecular film 18 floating on a water subphase 20. The substrate 12 may be selected from a wide variety of substances such as, for example, silicone, glass, aluminum, or other equivalent materials. Where the substrate is non-conductive, typically, before being coated, it will first be covered with a layer of conductive material as described more particularly hereinafter.

If desired, the surface of the substrate may be treated to enhance or alter its tendency to attract or repel a particular end of the coating molecule. To illustrate, where a substrate with an oxide surface such as glass coated with aluminum is employed, the outside surface of the oxidized aluminum can be made more hydrophobic, for instance, by treating it with hexamethyldisilazane. In the course of the treatment, which may be effected by suspending the substrate above the hexamethyldisilazane liquid, the vapor of the latter reacts with the oxide surface, attaching methyl groups that form a reasonably hydrophobic surface.

Figure 3:
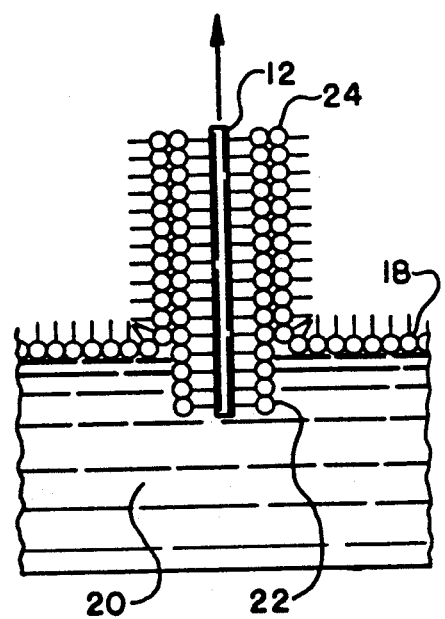
FIG. 3 is a diagrammatic representation of the sequential application of multiple layers of tricosenoic films of the invention in a Langmuir-Blodgett balance.

FIG. 3 is a diagrammatically representation of the sequential application of layers of tricosenoic films of the invention in a Langmuir-Blodgett balance. As illustrated, the substrate 12, already coated with a first film layer 20, is withdrawn from beneath the water subphase 20, which is coated with a mono-molecular film 18. In the course of the withdrawal, a second film layer 24 is deposited on the first film layer 22 in a head-to-head fashion, the hydrophobic, aliphatic tail portion of the first layer being attached to the substrate 12, while the aliphatic tail portion of the second film layer extends outwardly in a position where it is receptive to the aliphatic tail portion of a third film layer, not shown.

Notwithstanding the fact that the number of molecular layers may be varied, it has been determined that tricosenoic films formed from up to 9 layers exhibit pyroelectric coefficients having values as described in the preceding, together with superior heat sensitivities.

Figure 4:
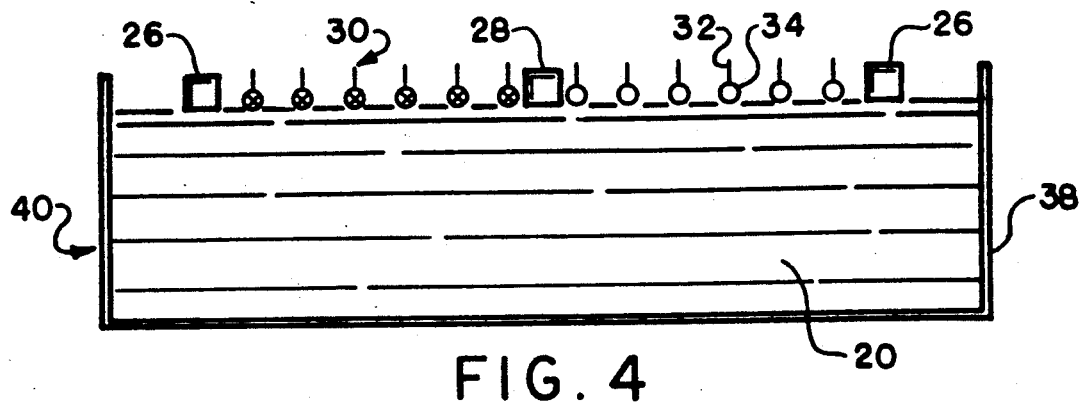
FIG. 4 is a representational illustration of a double-compartment Langmuir-Blodgett balance of a type well known in the art, after solutions of the triconsenoic compounds of the invention have been deposited on the aqueous subphase thereof.

FIG. 4 is a representational illustration of a double compartment Langmuir-Blodgett balance, a type well known in the art, after solutions of the tricosenoic compounds of the invention have been deposited on the aqueous subphase thereof. The Figure shows a Langmuir-Blodgett balance, generally 40, comprising a trough 38 containing a water subphase 20. Two movable barriers 26 form, in conjunction with a stationary battier 28, two film deposition compartments. In one of the latter, a solvent solution of one of the tricosenoic molecules, generally 30, is deposited, a solution of the other tricosenoic molecule being deposited in the other compartment. The hydrophilic head end of the molecule 34 aligns itself adjacent to the subphase, with the hydrophobic end 32 of the molecule being oriented opposite to the subphase. Among acid and amine materials from which films of the tricosenoic type described may be formed, the omega-tricosenoic acid and omega-tricosenoic amine are greatly preferred since the two materials are very stable on the water subphase, and the range of temperatures at which superior films can be deposited is relatively broad. Furthermore, the films made from such materials provide a high ratio of area to mass, yielding temperature responsive structures having high degree of sensitivity.

Importantly, the tricosenoic acid and the amines disclosed herein both possess a double bond point of unsaturation in the omega position at the terminal end of the molecule. Among other advantages of polymerization double bonds located near the end of the molecules forming the film layers, particularly in the terminal position of the molecules, is the fact that not only can strong films be formed by their polymerization, but the location of the double bonds near the end of the molecules avoids spatial interference with adjacent parallel molecules, adding to the uniformity of the films that can be produced.

Figure 5:
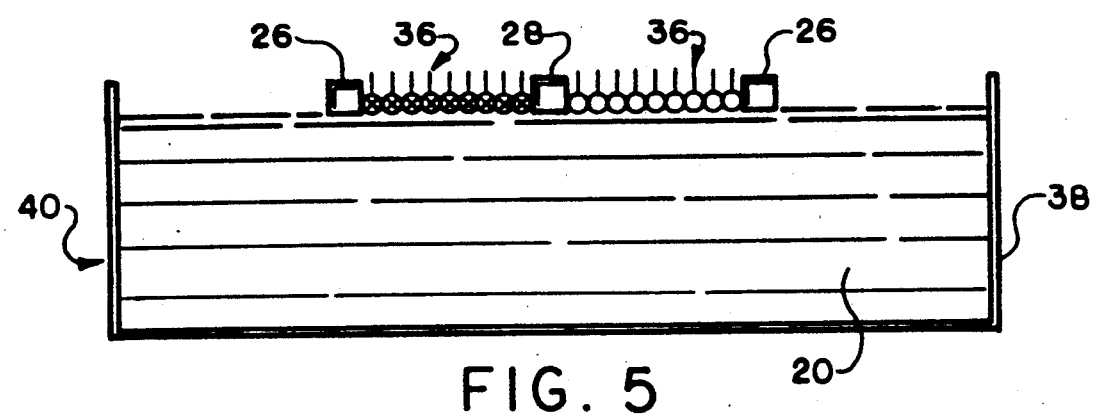
FIG. 5 shows the representational illustration of the Langmuir-Blodgett balance of FIG. 4, following compression of mono-molecular layers into quasi-solid films.

FIG. 5 shows a representational illustration of the Langmuir-Blodgett balance of FIG. 4 following compression of the mono-molecular layers to a quasi-solid film. In the compression step, the movable barriers 26 have been moved in the direction of the stationary barrier 28, resulting in the compression of the molecular floating on the subphase 20 contained in trough 38, to form a close-packed film 36. The molecules of the invention can be polymerized, for instance, by exposure of the films to ultraviolet or other high energy radiation. Polymerization not only produces strong films exhibiting a particularly uniform structure, but the resulting films are formed substantially without voids or cracks therein.

Figure 6:
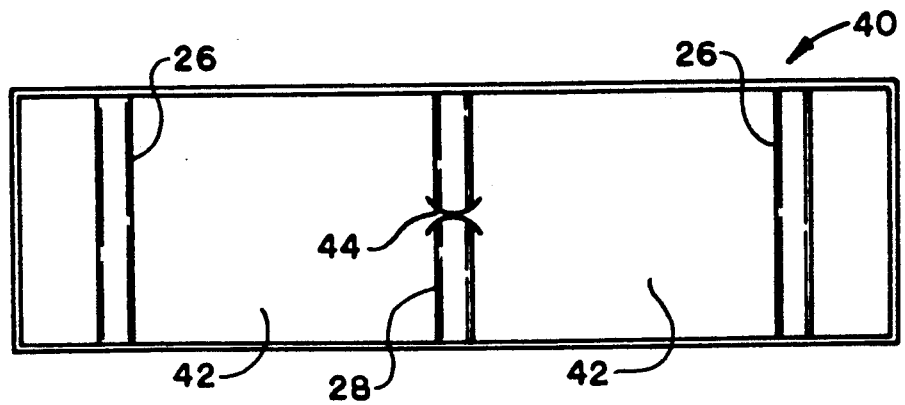
FIG. 6 is a semischematic illustration of a double-compartment Langmuir-Blodgett balance of a type suitable for coating films of the invention on substrates.

FIG. 6 is a semi-schematic illustration of a double compartment Langmuir-Blodgett balance of a type well suited for coating films of the invention on substrates.

Figure shows the Langmuir-Blodgett balance 40 with movable barriers 26 disposed on either side of the stationary barrier 28, forming the two film compartments 42. The stationary barrier 28 has a compartment gate 44 disposed therein. In the dipping process, the substrate mounted on the end of a dip stick, not shown, can be moved with stepper motors and associated drive gears up and down within, and back and forth between the compartments. For example, in the case of forming tricosenoic films, the dip stick mounted substrate is lowered through the coated surface of a first compartment, coated with a first of the molecules, and maintained under the surface of the subphase while the dip stick s forced through the spring-like compartment gate 44 to the second compartment where it is raised through the surface of the liquid in the latter compartment, coated with the other molecule. The procedure results in the coating of one type of molecule on the other type. The substrate is thereafter transported above the surface of the trough to the initial trough where it is passed back down through the surface of the coated liquid, depositing the third layer on the substrate. The process is repeated until a laminate of the desired number of layers has been produced.

Figure 7:
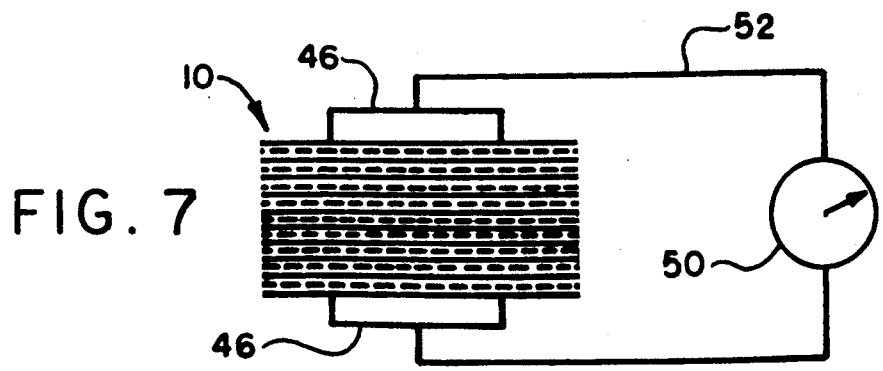
FIG. 7 is a schematic illustration of a detection device using multi-layer tricosenoic films of the invention.

FIG. 7 is a schematic illustration of a detection device using multi-layer tricosenoic films of the invention. A similar device may be used in connection with the highly polar liquid crystalline polymeric amphiphiles of the invention.

As illustrated, a laminated film 10 is shown electrically connected to electrodes 46, which in turn are connected by wires 52 to a coulombmeter 50. The thickness of the laminate will be depend upon the number of layers from which it is made; however, in a preferred embodiment of the invention, the film will be from about 25 to about 30 nanometers thick. When polymerized, such a film has been found to exhibit adequate film strength characteristics, while at the same time being thin enough to exhibit desirable thermal sensitivity.

The electrodes may be fabricated in any of the well-known ways. Where glass or silicon substrates are employed, for example, an aluminum electrode can be structured onto the ends of the laminate film, by evaporating aluminum thereon. In cases where electrodes of a particular shape are required, the evaporation can be effected through "shadow" masks. Other techniques may be employed, however, including photolithography techniques.

The films of the invention have broad application, including use in devices employed in infrared spectroscopy, infrared surveillance, heat detection, and a variety of other uses.

The following examples, while not intended to be limiting in nature, are illustrative of the invention.

PREPARATION OF OMEGA-TRICOSENOIC ACID 10-undecenyl chloride (22.31 g, 0.10 mole) in dry chloroform (50 ml) is added dropwise over a period of 1¼ hours to a stirred solution of N-(1-cyclododecenyl)-morpholine (27.70 g, 0.11 mole) and triethylamine (10.91 g, 0.11 mole) in 150 ml dry chloroform, the materials being combined in a 500 ml 3-neck flask. The temperature of the reaction is controlled at 35° to 38° C., and the mixture is maintained at that point for 3 more hours after the addition is completed. The enamine thus formed is then hydrolyzed by adding 100 ml of 20% HCl, followed by refluxing at 60° C. The reaction, occurring at the interface, continues for 5 hours. The chloroform layer is thereafter separated and washed with 150 ml of water. The washings are then combined with the aqueous water layer, neutralized with sodium hydroxide solution to a pH of 6.9, and extracted with chloroform, 2×500 ml. Following neutralization, the chloroform extracts are combined and evaporated to dryness in a rotovapor. The resulting red-brown oily product is poured into a 1000 ml flask equipped with a mechanical stirrer, and 18 ml of KOH solution, 20 g KOH in 18 ml of water, are added dropwise to the flask, maintained at 100° C. in a boiling water bath. The total reaction time is 15 minutes, and the resulting product is a viscous semi-solid. The product is subsequently dissolved in 1700 ml of hot water and acidified with concentrated HCl. The precipitates are filtered off, washed with 400 ml of water, and dried overnight. The product is recrystallised with a mixture of petroleum ether and hexane to yield a white powder. The melting temperature is found to be 86° C.

The keto-acid thus formed, $CH_2=CH-(CH_2)_8CO(CH_2)_{11}COOH$, (3.66 g, 0.01 mole) is dissolved in 65 ml of diethylene glycol in a 250 ml 3-neck flask, along with 0.65 g of KOH (0,01 mole) and 4.3 ml of anhydrous hydrazine (0.13 mole). The solution is heated to 105° C. for 1 hour, after it is cooled to about 30° C. in a water bath, and 2.2 gm of KOH (0.04 mole) are added. The temperature is then quickly raised to about 140° C., and the condenser is removed to let the excess amount of hydrazine evaporate. After completion of the evaporation, about 20 minutes, the condenser is replaced and the temperature of the reactor is raised to 200° C. for one hour. The mixture is next cooled to about 50° C. and poured into 520 ml of dilute HCl (8%). The precipitates are extracted with ether, 2×120 ml, and washed with 25 ml of water. The washings are thereafter extracted with ether, and the combined ether materials dried in a rotovapor. The product is recrystallised with ethanol twice, and petroleum ether once, to yield the omega-tricosenoic acid, $CH_2=CH-(CH_2)_{20}COOH$, as a white crystalline powder. The melting temperature of the acid material is 73° C.

PREPARATION OF OMEGA-TRICOSENOIC AMINE

The 22-tricosenoic acid is converted to an amide in the following way. 1.2 g of 22-tricosenoic acid (0.0033 mole) are dissolved in 15 ml of dry, thiophene-free benzene. Then 2.5 ml of thionyl chloride (0.034 mole) are added. The system is purged with argon for 5 minutes before refluxing. The mixture is thereafter heated by means of an oil bath at a temperature of 50° to 54° C., and reflux is continued for 3 hours. The mixture is then cooled and immediately poured into 5 ml of aqueous ammonia at 0° C. The mixture is extracted with 200 ml of hot benzene, and the solution dried in a rotovapor. The product is subsequently recrystallised from benzene twice to yield the amide with a melting temperature of 106° C.

The 22-tricosenoic amide is reduced to the amine, $CH_2=CH-(CH_2)_{21}NH_2$, with lithium aluminum hydride. In the procedure, THF is distilled over $LiAlH_4$ powder twice, immediately before use, and the apparatus glassware is dried in an oven at 130° C. for a minimum of 24 hours before use. The glassware is then assembled while hot, and the system purged with argon gas. At this point, to a 5 ml of 1 molar solution of $LiAlH_4$ in tetrahydrofuran, THF, is added 0.41 g of the amide (0.0012 mole) dissolved in 25 ml of dry THF over a period of 0.5 hr. The addition is carried out slowly to maintain a gentle reflux. The reflux is continued for 3 hours, and the mixture thereafter cooled to room temperature. The mixture is then allowed to sit for an additional 4 hours with constant stirring at room temperature. The excess amount of $LiAlH_4$ is decomposed by adding 1 ml of water, and 15 ml of 15% NaOH solution. The mixture is subsequently extracted with ether (100 ml), and the resulting ether solution is dried in a rotovapor. The product is recrystallized in hexane once, and methanol twice, to yield the omega-tricosenoic amine, having a melting temperature of 88° C.

PREPARATION OF LAMINATE

A glass microslide is degreased by consecutive five minute ultrasonic immersions in trichloroethylene, acetone, and methanol. The degreased microslide is coated with aluminum by vacuum deposition and fastened to a teflon dip stick.

After insertion of the substrate beneath the water subphase, each of the compartments of a "double-compartment" trough of the type described in connection with FIG. 6 is coated with the components of the laminate to be formed, i.e., one compartment with the omega-tricosenoic acid, the other with the omega-tricosenoic amine. The pH of the water subphase is adjusted to 5.5, and the temperature of the subphase maintained at from about 19° to 20° C. The movable barrier in the acid compartment is adjusted so that the pressure on the surface film is from about 28 to 30mN/m, while the barrier in the amine compartment is adjusted to provide a film pressure of from about 36 to about 37mN/m. The movement of the dip stick through the surface layers is adjusted to provide coating speed in the acid compartment of about 15 to 20 mm/minute, while the coating speed through the amine layer is carried out at about 10 mm/minute.

In the coating process, the dip stick is first moved up through the layer of omega-tricosenoic acid in the acid compartment, and then down through the layer of omega-tricosenoic amine in the amine compartment. The substrate is then moved under the water subphase back to the acid compartment, the dip stick passing through the gate of the stationary barrier. The substrate is thereafter again passed upward through the acid layer. The process continues until nine layers have been deposited, the last layer being an acid layer. The laminated film thus prepared which shows a thickness of about 27 nm, is then polymerized by exposure to an ultraviolet lamp.

An aluminum electrode is thereafter evaporated onto the top of the film at the rate of about 1 nm/second, the slow rate being employed to minimize any degradation of the film.

In order to verify that a polar structure had been produced, a pyroelectric measurement is made on the alternating layered film sample by placing the sample on the heating stage of a Wentworth probing station. The entire station is enclosed in an aluminum box to reduce air currents and electronic interference. Gold wires are attached to the electrodes by means of a room temperature curable silver conductive epoxy to facilitate electrical contact. An electro meter operated in the coulomb mode to evaluate the change in surface charge with temperature is then connected, and the temperature of the stage is ramped up and down between 30° C. and 50° C. by means of an electrical heating element and circulating cooling water. The average pyroelectric coefficient measured is about $1.14 \times 10^{-10} C\, cm^{-2} K^{-1}$.

In subsequent, similar experiment, following deposition of the acid and amine layers in the respective compartments, an ultraviolet lamp housed in the trough top is activated, resulting in polymerization of the molecules on the subphase surface. Subsequently, the dipping procedure is carried out on the polymerized films, resulting in a particularly stable laminate which also exhibits pyroelectric coefficients having values of the order previously described.

The mechanical strength and dimensional stability of the multi-layer films is greatly improved by polymerizing the molecules either at the gas-water interface, or in the solid state by high energy radiation sources. Polymerization of the Langmuir-Blodgett films typically results in a polymer backbone lying in the plane of the substrates. The improved strength in the layered planes, coupled with the strong interaction between the polar groups within the successive layer planes, leads to a desirable overall strengthening of the multi-layer structures. While the rate of polymerization will vary, depending upon the strength of the radiation and the temperature employed, at about 60° C. the period of treatment will typically be from about 45 to 65 minutes in the case of ultraviolet radiation employing a UV pencil lamp having a power intensity of 4500 microwatts/cm$^2$ at 2cm, placed at 4.5cm from the films. Gamma ray, ultraviolet, or other types of high energy radiation may all be employed to achieve the polymerization.

PREPARATION OF THE QUATERNARY SALT OF DIMETHYLAMINOETHYL METHYLACRYLATE WITH 4'-METHOXY -4- (ω-MESYL -UNDECANYL -1-OXY) αMETHYLSTILLBENE

In a still further experiment a highly polar liquid crystalline polymeric amphiphile is prepared as follows.

To a 500 ml three neck flask equipped with thermometer, condenser, magnetic stirrer, and gas bubbler are added 4-methoxyphenylacetic acid (35.3 g, 0.2125 mole), phenol (20.0 g. 0.2125 mole), and 200 ml of CCl$_4$. The reaction mixture is heated to 60° C. under a nitrogen atmosphere. BF$_3$ gas is bubbled slowly through the reaction mixture until saturation is reached (22.0 g, 0.3240 mole). Stirring is continued for about 20 hours at 60° C. The reaction mixture is then cooled to room temperature and the resulting viscous reaction mixture is treated with aqueous NaOH solution. The aqueous layer is separated, acidified with dilute HCl, and the resulting precipitate is filtered, washed with water, and dried. The crude product is recrystallized from methanol to yield 27.4 g (53%) of shiny 4-hydroxyphenyl-4'-methoxybenzylketone crystals.

Thereafter, a one liter three neck flask equipped with nitrogen inlet-outlet, condenser, addition funnel, magnetic stirrer and containing 7.23 g (0.2973 mole) of Mg turnings and a crystal of iodine is flamedried and then cooled to room temperature. A solution of CH$_3$ I (18.5 ml, 0.2973 mole) in 185 ml of dry diethyl is added dropwise at such a rate as to maintain gentle reflux (about 1 hour). After the addition is completed, the reaction mixture is stirred under reflux until all the Mg is dissolved. Then a solution of 24.0 g (0.0991 mole) of 4-hydroxyphenyl- 4'-methoxybenzylketone in 350 ml of dry tetrahydrofuran is added dropwise to keep the reaction mixture under reflux (2 hrs.). After the addition is completed, the reaction mixture is stirred at room temperature overnight. It is then cooled in an ice water bath, and a saturated aqueous NH$_4$ Cl solution is added dropwise under nitrogen until the white dispersion separates into organic and aqueous phases. The organic phase is thereafter separated, and the mixture of solvents is removed in a rotavapor. The remaining tertiary alcohol is dissolved in toluene, traces of p-toluenesulofonic acid are added, and the toluene is removed in a rotavapor. During this distillation process, the dehydration of the tertiary alcohol takes place and the water produced is allotropically distilled with toluene. The resulting solid is recrystallized from methanol to yield 17.1 g (72%) of white 4-hydroxy-4'-methoxy- -methylstilbene, that is, 4'-MHMS crystals.

Following the preceding, (0.911 g, 0.0162 mole) of KOH is dissolved in 100 ml of 70%) ethanol. 4'-MHMS (3.90 g, 0.0162 mole) and 11-bromo-1-undecanol (4.49 g, 0.0179 mole) are added together with a small amount of KI to the reaction mixture, which is refluxed for 24 hrs. The alcohol is removed in a rotavapor and the resulting solid is washed successively with water, dilute aqueous NaOH, and water. Recrystallization from methanol yields 4.77 g (72%) of white 4'- methoxy-4-(ω-hydroxyundecanyl-1-oxy)-α-methylstilbene, that is, 4'-11-CH crystals.

Thereafter, 4'-11-OH (6g, 0.0146 mole) is dissolved in 250 ml of dry THF. Trimethylamine (4.69 ml, 0.0336 mole) is added to the solution. At room temperature, mesylchloride (2.9 ml, 0.0366 mole) is then added to the solution, which is stirred overnight. The precipitated Et$_3$ N·HCl is filtered and the solvent is removed in a rotavapor. The resulting solid is washed with water and crystallized from chloroform and hexane to yield 4.65 g (65%) of white 4'-methoxy-4-(ω-mesyl-undecanyl-1-oxy)-α-methylstilbene, that is, 4'-11-mesyl crystals.

4'-11-mesyl (4 g, 8.188 mole) is dissolved in 40 ml of dimethylaminoethyl methacrylate, that is, DMAEMA, (with 2 wt. % p-methoxyphenol) and 20 ml acetone. The reaction mixture is stirred overnight at 40° C. The precipitated solid is obtained by filtration and washed with chloroform and acetone. Crystallization from methanol and acetone yields 0.9 g (17%) of white DMAEMA combined with 4'-11-mesyl crystals.

Multi-layer polymerized films are thereafter formed by techniques similar to those previously described.

While in accordance with the patent statutes a preferred embodiment and best mode has been presented, the scope of the invention is not limited thereto, but rather is measured by the scope of the attached claims.

What is claimed is:

1. A non-centrosymmetric polymerized film structure formed from unsaturated, amphiphilic, polymerizable salts having molecular configurations adapted for ordering in adjacent parallel rows, wherein a plurality of said adjacent ordered parallel rows are positioned in substantially adjacent mono-molecular parallel layers to form said film structure having up to about nine layers, said salts comprising members selected from the group consisting of (1) a terminally unsaturated, straight chain aliphatic acid in association with a terminally unsaturated, straight chain aliphatic amine, and (2) an unsaturated polymerizable salt containing both a polar group and a mesogen, being capable of mesomorphic molecular arrangement.

2. A structure according to claim 1 wherein said salt is a polymerizable salt containing both a polar group and a mesogen capable of mesomorphic molecular arrangement.

3. A structure according to claim 1 wherein said salt is a methacrylate ester sulfonate, containing a quaternary ammonium ion and a stilbene mesogen.

4. A structure according to claim 1 wherein said salt is formed from said acid and said amine, said acid being omega-tricosenoic acid, and said amine being omega-tricosenoic amine.

5. A structure according to claim 4 in which the outermost layers of the laminate are formed from said omega-tricosenoic acid.

6. A structure according to claim 4 in which said laminate film is formed on a substrate and the outermost layer of the laminate film is formed from said omega--tricosenoic acid, and the aliphatic portion of the innermost layer is adjacent said substrate.

7. The structure of claim 4 in which said laminate has an electrically conductive electrode positioned adjacent each end thereof.

8. A non-centrosymmetric polymerized laminate film structure formed from unsaturated, amphiphilic, polymerizable salts having molecular configurations adapted for ordering in adjacent parallel rows, wherein a plurality of said adjacent ordered parallel rows are positioned in substantially adjacent mono-molecular parallel layers to form said film structure having a thickness of from about 25 to about 30 nanometers, said salts comprising members selected from the group consisting of (1) a terminally unsaturated, straight chain aliphatic acid in association with a terminally unsaturated, straight chain aliphatic amine, and (2) an unsaturated polymerizable salt containing both a polar group and a mesogen, being capable of mesomorphic molecular arrangement.

* * * * *